United States Patent
Kitaoka

(10) Patent No.: US 12,351,179 B2
(45) Date of Patent: Jul. 8, 2025

(54) METHOD AND APPARATUS FOR SUPPORTING DRIVING OF VEHICLE

(71) Applicant: TOYOTA JIDOSHA KABUSHIKI KAISHA, Toyota (JP)

(72) Inventor: Tomohiro Kitaoka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 18/380,229

(22) Filed: Oct. 16, 2023

(65) Prior Publication Data

US 2024/0190437 A1 Jun. 13, 2024

(30) Foreign Application Priority Data

Dec. 13, 2022 (JP) ................................ 2022-198550

(51) Int. Cl.
*B60W 30/18* (2012.01)
*B60W 30/16* (2020.01)

(52) U.S. Cl.
CPC .... *B60W 30/18163* (2013.01); *B60W 30/162* (2013.01); *B60W 2554/802* (2020.02); *B60W 2556/65* (2020.02)

(58) Field of Classification Search
CPC ......... B60W 30/18163; B60W 30/162; B60W 2554/802; B60W 2556/65; B60W 30/0956; B60W 30/16
See application file for complete search history.

(56) References Cited

U.S. PATENT DOCUMENTS

| | | | |
|---|---|---|---|
| 10,793,147 B2 | 10/2020 | Kaminade et al. | |
| 10,870,349 B2 | 12/2020 | Uejima | |
| 10,953,883 B2 | 3/2021 | Sakaguchi | |
| 10,981,569 B2 | 4/2021 | Hashimoto et al. | |
| 11,014,563 B2 | 5/2021 | Hashimoto et al. | |
| 11,072,334 B2 | 7/2021 | Aoki et al. | |
| 11,267,473 B2 | 3/2022 | Takahashi | |
| 11,279,360 B2 | 3/2022 | Fukuda et al. | |
| 11,827,218 B2 * | 11/2023 | Belle | B60W 30/143 |
| 2018/0043935 A1 * | 2/2018 | Hashimoto | B62D 15/025 |
| 2019/0241195 A1 * | 8/2019 | Sakamoto | B62D 6/00 |
| 2019/0384305 A1 * | 12/2019 | Niibo | B60W 30/08 |
| 2020/0070889 A1 | 3/2020 | Fukuda et al. | |
| 2020/0247400 A1 | 8/2020 | Fujii | |
| 2021/0171042 A1 * | 6/2021 | Hayakawa | G08G 1/167 |
| 2021/0188264 A1 * | 6/2021 | Okuda | G08G 1/096791 |
| 2021/0201668 A1 * | 7/2021 | Oyama | G08G 1/0141 |

(Continued)

FOREIGN PATENT DOCUMENTS

JP 2017-021506 A 1/2017

*Primary Examiner* — Ashley L Redhead, Jr.
(74) *Attorney, Agent, or Firm* — Dinsmore & Shohl LLP

(57) ABSTRACT

Vehicle control for a lane change from a first lane to a second lane is executed. In this vehicle control, a target space is set in the second lane based on information on a space in the second lane. When a speed of a traffic stream of the second lane is higher than that in the first lane, it is determined whether acceleration of the vehicle is able to perform in a front space of the vehicle in the first lane. When it is determined that acceleration of the vehicle is able to perform, acceleration and steering control of the vehicle for moving from the first lane to the target space is executed. Otherwise, temporal deceleration control of the vehicle on the first lane is executed.

4 Claims, 12 Drawing Sheets

(56) References Cited

U.S. PATENT DOCUMENTS

| | | | |
|---|---|---|---|
| 2021/0269040 A1* | 9/2021 | Kurokawa | B62D 15/0265 |
| 2023/0021000 A1* | 1/2023 | Okonogi | B60W 10/04 |
| 2023/0077036 A1* | 3/2023 | Yamaguchi | B60W 30/16 |
| 2023/0360534 A1* | 11/2023 | Avedisov | G08G 1/052 |
| 2024/0067214 A1* | 2/2024 | Nagasaka | G01C 21/3492 |

* cited by examiner

METHOD AND APPARATUS FOR SUPPORTING DRIVING OF VEHICLE

CROSS-REFERENCE TO RELATED APPLICATION

The present application claims priority under 35 U.S.C. § 119 to Japanese Patent Application No. 2022-198550, filed on Dec. 13, 2022, the contents of which application are incorporated herein by reference in their entirety.

TECHNICAL FIELD

The present disclosure relates to a method and an apparatus for supporting driving of a vehicle.

BACKGROUND

JP2017-21506A discloses a device for supporting lane change of a vehicle. The device of the related art predicts whether a driver of the vehicle will select a lane change in the near future based on a driving scene of the vehicle. When it is predicted that the driver will select a lane change in the near future, the device of the related art detects a space (a lane change space) required to perform the lane change on a lane adjacent to the lane on which the vehicle is traveling. If the lane change space is not detected, the device of the related art adjusts the speed of the vehicle. The adjustment of the speed includes control performed by acceleration or deceleration of the vehicle. When the lane change space is detected as a result of the speed adjustment, the device of the related art notifies the driver that the lane change is available.

The lane in which the vehicle travels before the lane change is referred to as a "first lane", and the lane in which the vehicle travels after the lane change is referred to as a "second lane". The device of the related art performs speed adjustment in order to detect a lane change space in the second lane at the time of lane change from the first lane to the second lane.

Consider a case where the respective speeds of the traffic streams of the first and second lanes are substantially constant and the speed of traffic stream of the second lane is higher than that of the first lane. In this case, it is expected that the lane change space can be detected with the lapse of time without performing speed adjustment for detecting the lane change space. However, in this case, it is desirable to accelerate the vehicle during the lane change after the detection of the lane change space and increase the speed of the vehicle to the speed of traffic stream of the second lane. This is because, if the lane change is performed in a state in which the speed of the vehicle is maintained, it is predicted that an influence on the traffic stream of the second lane occurs such that the following vehicle of the vehicle is forced to decelerate after the lane change.

However, there may be a situation where it is difficult to accelerate the vehicle during lane change. For example, there is a case where a preceding vehicle of the vehicle is present in the first lane and the distance from the vehicle to the preceding vehicle is short. In this case, there is a possibility that the execution of the lane change is abandoned even though the lane change space is detected in the second lane.

It is an object of the present disclosure to provide a technique capable of avoiding a situation in which the execution of the lane change from the first lane to the second lane is abandoned when the speed of the traffic stream of the second lane is higher than that in the first lane.

SUMMARY

A first aspect of the present disclosure is a method for supporting driving of a vehicle including a lane change from a first lane to a second lane and has the following features.

The method comprising the step of executing vehicle control for the lane change based on information on a driving environment of the vehicle. The information on the driving environment includes information on a space in the second lane, information on a speed of a traffic stream of the second lane, information on the speed of the traffic stream of the first lane, and information on a front inter-vehicular distance indicating a distance between the vehicle and a preceding vehicle of the vehicle in the first lane.

The step of executing the vehicle control comprises the steps of:
  setting a target space in the second lane based on the information on the space in the second lane;
  when the speed of the traffic stream of the second lane is higher than that in the first lane, determining whether acceleration of the vehicle is able to perform in a front space of the vehicle in the first lane based on the front inter-vehicular distance, a shortened inter-vehicular distance indicating a distance between the vehicle and the preceding vehicle that is shortened when the vehicle runs on the first lane at a preset acceleration rate, and a front safe distance from the vehicle to the preceding vehicle;
  executing acceleration and steering control of the vehicle to move from the first lane to the target space when it is determined that the acceleration of the vehicle is able to perform; and
  executing temporal deceleration control of the vehicle on the first lane when it is determined that the acceleration of the vehicle is unable to perform.

A second aspect of the present disclosure is a device for supporting traveling of a vehicle including a lane change from a first lane to a second lane and has the following features.

The apparatus includes a processor configured to execute vehicle control processing for the lane change based on information on a driving environment of the vehicle. The information on the driving environment includes information on a space in the second lane, information on a speed of a traffic stream of the second lane, information on the speed of the traffic stream of the first lane, and information on a front inter-vehicular distance indicating a distance between the vehicle and a preceding vehicle of the vehicle in the first lane.

In the vehicle control processing, the processor is configured to:
  execute processing to set a target space in the second lane based on the information on the space in the second lane;
  when the speed of the traffic stream of the second lane is higher than that in the first lane, execute processing to determine whether acceleration of the vehicle is able to perform in a front space of the vehicle in the first lane based on the front inter-vehicular distance, a shortened inter-vehicular distance indicating a distance between the vehicle and the preceding vehicle that is shortened when the vehicle runs on the first lane at a preset acceleration rate, and a front safe distance from the vehicle to the preceding vehicle;

execute processing to perform acceleration and steering control of the vehicle to move from the first lane to the target space when it is determined that the acceleration of the vehicle is able to perform; and execute processing to perform temporal deceleration control of the vehicle on the first lane when it is determined that the acceleration of the vehicle is unable to perform.

According to the present disclosure, if the speed of the traffic stream of the second lane is higher than that in the first lane, it is determined whether acceleration of the vehicle is able to perform in the front space of the vehicle in the first lane. When it is determined that acceleration of the vehicle is able to perform, acceleration and steering control of the vehicle to move from the first lane to the target space in the second lane is executed. On the other hand, when it is determined that acceleration of the vehicle is unable to perform, temporal deceleration control of the vehicle in the first lane is executed. That is, when it is determined that the acceleration of the vehicle is unable to perform, the temporal deceleration control of the vehicle in the first lane is executed before the acceleration of the vehicle and the steering control are executed. Therefore, even when the speed of the traffic stream of the second lane is higher than that of the first lane and the vehicle is unable to accelerate in the front space of the vehicle in the first lane, it is possible to get out of the situation in which the execution of the lane change from the first lane to the second lane is abandoned.

DESCRIPTION OF EMBODIMENT

Figure 1:
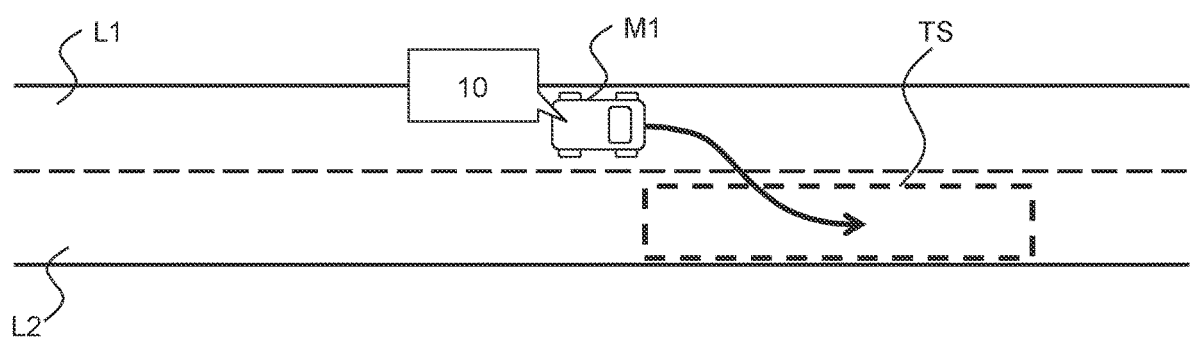
FIG. 1 is a diagram illustrating an outline of a lane change.

An embodiment of the present disclosure will now be described with reference to the drawings. In the drawings, the same or corresponding parts are denoted by the same reference numerals, and the description thereof will be simplified or omitted.

1. Outline of Embodiment 1-1. Lane Change

FIG. 1 is a diagram illustrating an outline of a lane change. FIG. 1 shows a vehicle M1. The vehicle M1 travels by autonomous driving or manual driving by a driver. A driving support apparatus 10 according to the embodiment is mounted on the vehicle M1. The driving support apparatus 10 executes control to support a traveling by the autonomous driving or manual driving by the driver in the vehicle M1. The driving support control by the driving support apparatus 10 includes vehicle control for lane change.

The vehicle M1 is traveling in the first lane L1. In the embodiment, a lane change from a first lane L1 to a second lane L2 is considered. In the vehicle control for this lane change, a target space TS is set in the second lane L2. When the target space TS is set, steering control for moving from the first lane L1 to the target space TS is performed.

1-2. Features of Lane Change 1-2-1. First Feature

Figure 2:
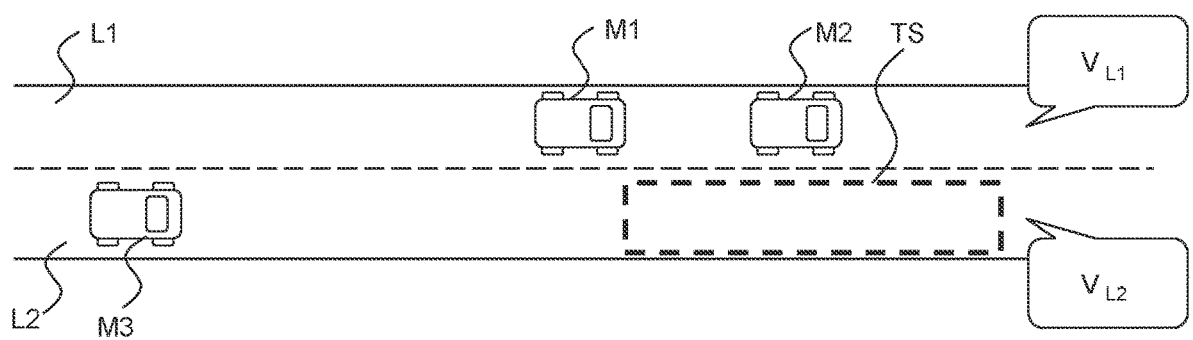
FIG. 2 is a diagram illustrating a first scene assumed by an embodiment.

FIG. 2 is a diagram illustrating a first scene assumed by the embodiment. In FIG. 2, vehicles M2 and M3 are depicted in addition to the vehicle M1. The vehicle M2 is a vehicle traveling ahead of the vehicle M1 in the first lane L1 (that is, a preceding vehicle). The vehicle M3 is a vehicle traveling in the second lane L2. The vehicle M3 is a vehicle that will travel behind the vehicle M1 when the vehicle M1 moves to the target space TS (that is, a following vehicle in the future).

In the embodiment, a speed of traffic stream is considered for each lane. The speed of traffic stream of the first lane L1 shown in FIG. 2 is referred to as a "speed $V_{L1}$", and the speed of the traffic stream of the second lane L2 is referred to as a "speed $V_{L2}$". The speed $V_{L1}$ is, for example, a speed $V_{M1}$ of the vehicle M1. In another example, the speed $V_{L1}$ is the speed $V_{M2}$ of the vehicle M2. In yet another example, the speed $V_{L1}$ is an average of the speed $V_{M1}$ and the speed $V_{M2}$. When the speed $V_{M1}$ and the speed $V_{M2}$ are substantially equal to each other, the speed $V_{M1}$ or the speed $V_{M2}$ can be considered as the speed $V_{L1}$. When there is a difference between the speed $V_{M1}$ and the speed $V_{M2}$, the average of the speed $V_{M1}$ and the speed $V_{M2}$ may be considered as the speed $V_{L1}$. The speed $V_{L2}$ is, for example, a speed $V_{M3}$ of the vehicle M3.

Note that the speed $V_{M1}$, the speed $V_{M2}$, and the speed $V_{M3}$ are calculated from the time series for the past "t" seconds. For example, the speed $V_{M1}$ is calculated as an average of time-series date detected from a certain time point in the past to the current time point. The speed $V_{M2}$ and the speed $V_{M3}$ are estimated by using a probability model such as a Kalman filter.

Figure 3:
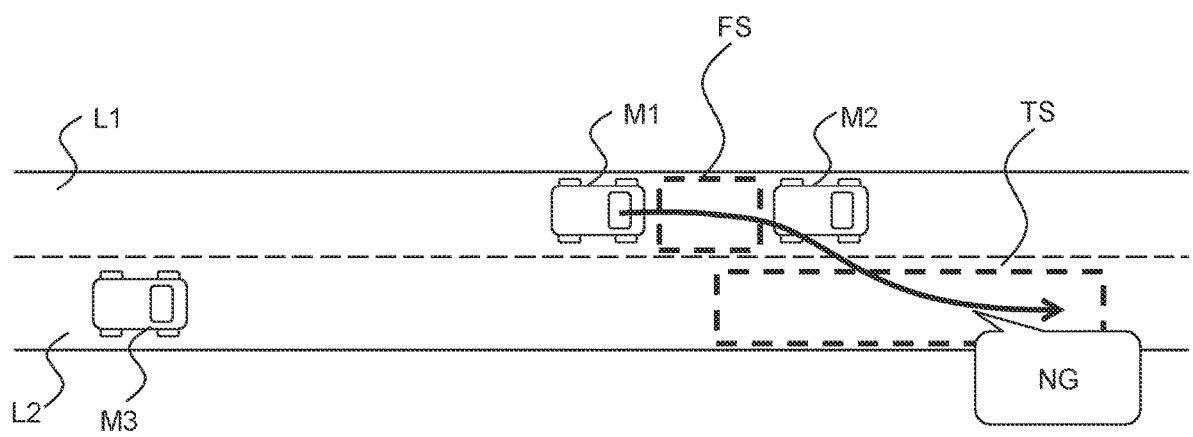
FIG. 3 is a diagram illustrating an outline of the embodiment.
Figure 4:
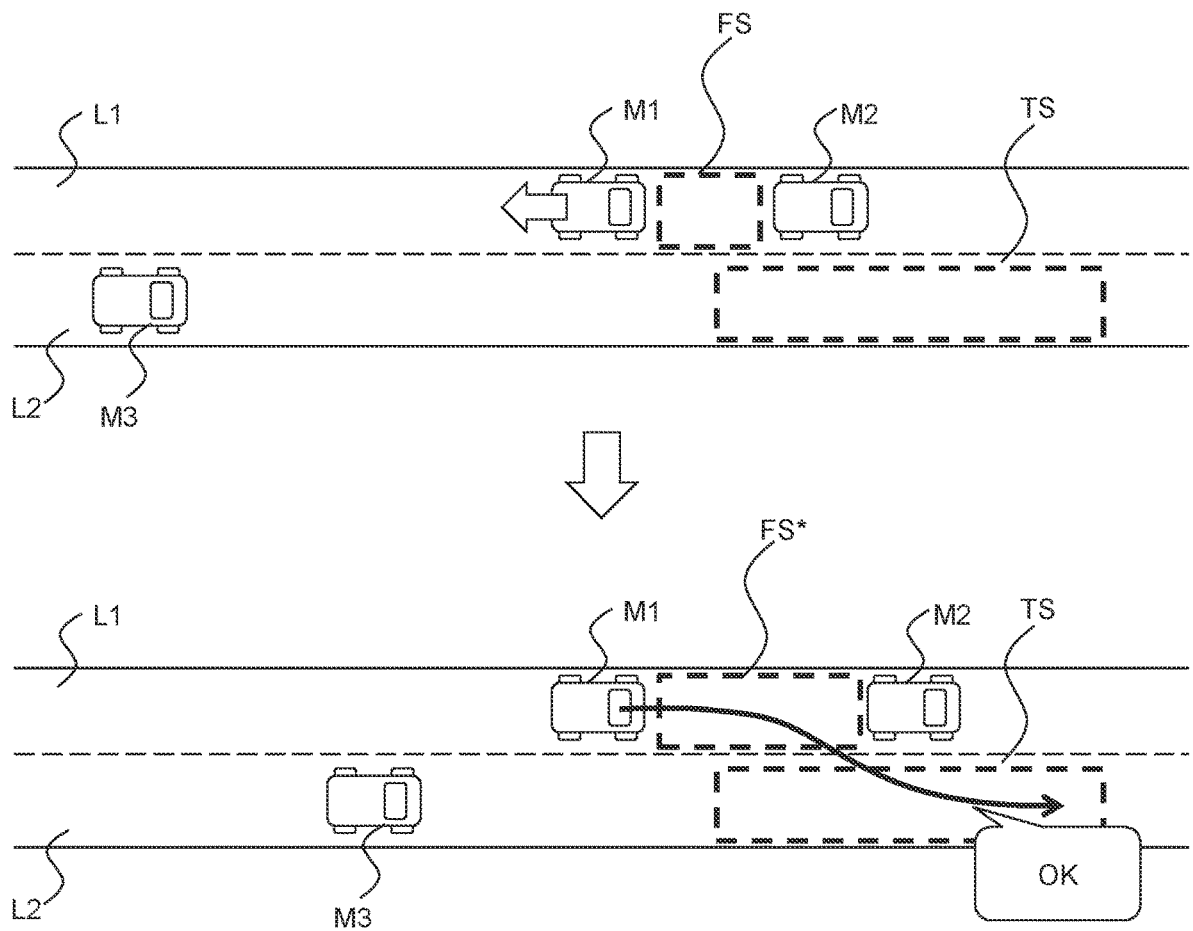
FIG. 4 is a diagram illustrating the outline of the embodiment.

FIGS. 3 and 4 are diagrams illustrating an outline of the embodiment. When the speed $V_{L2}$ is higher than the speed $V_{L1}$ ($V_{L2}>V_{L1}$), it is desirable to accelerate the vehicle M1 during the lane change to increase the speed $V_{M1}$ to the speed $V_{L2}$. The reason for this is that after the lane change, an occurrence of an influence is predicted on the traffic stream of the second lane L2, such as forcing the vehicle M3 to decelerate. However, when the length of a front space FS of the vehicle M1 in the first lane L1 (that is, a distance from the vehicle M1 to the vehicle M2) is short, the vehicle M1 cannot be sufficiently accelerated in the first lane L1 (FIG. 3).

Therefore, in the embodiment, in the vehicle control for the lane change, control (deceleration control) for decelerating the vehicle M1 in the first lane L1 is temporarily performed. As shown in FIG. 4, when the deceleration control is temporarily performed, the front space FS is expanded to become the front space FS*. As a result, it is possible to perform control (acceleration control) for accelerating the vehicle M1 in the first lane L1 and steering control for moving from the first lane L1 to the target space TS. That is, according to the embodiment, in the case where the speed $V_{L2}$ is higher than the speed $V_{L1}$, the lane change can be performed even when the length of the front space FS is short.

1-2-2. Second Feature

Figure 5:
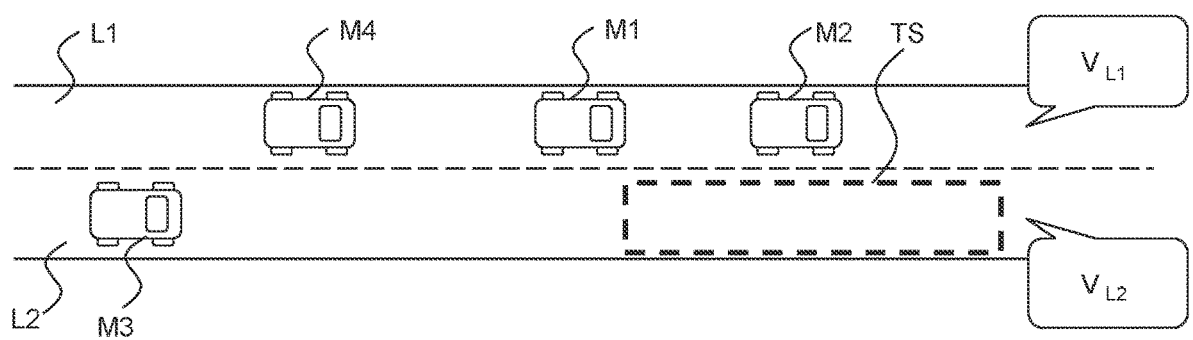
FIG. 5 is a diagram illustrating a second scene assumed by the embodiment.

FIG. 5 is a diagram illustrating a second scene assumed by the embodiment. In FIG. 5, a vehicle M4 is depicted in addition to the vehicles M1, M2 and M3. The vehicle M4 is a vehicle that travels behind the vehicle M1 in the first lane L1 (that is, a following vehicle). When the vehicle M4 is present, the speed $V_{L1}$ is the speed $V_{M1}$, the speed $V_{M2}$, or the speed $V_{M4}$. If there is a difference among these speeds, the average of the speed $V_{M1}$, the speed $V_{M2}$ and the speed $V_{M4}$ can be considered as the speed $V_{L1}$.

Figure 6:
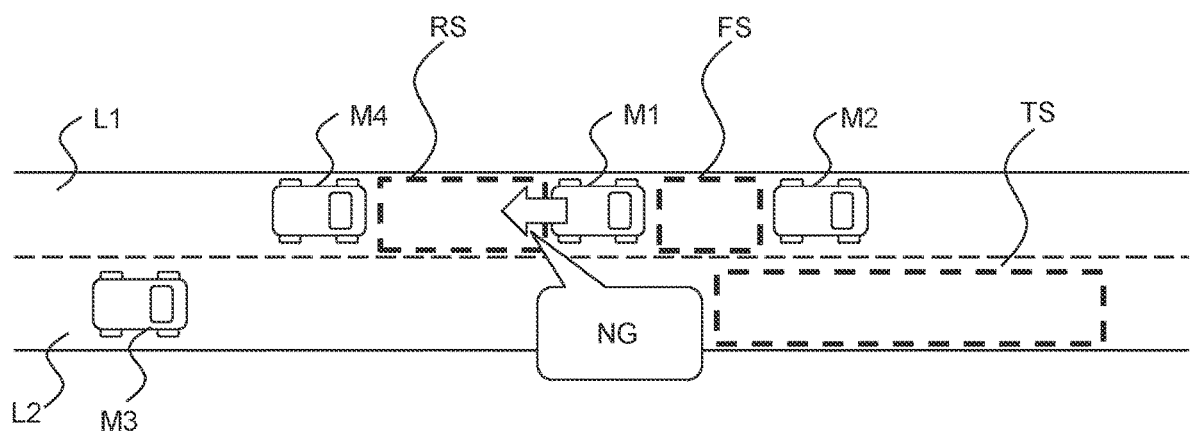
FIG. 6 is a diagram illustrating the outline of the embodiment.

FIG. 6 is a diagram for explaining the outline of the embodiment in the second scene. When the deceleration control is performed in a case where the vehicle M4 is present, the length of a rear space RS of the vehicle M1 in the first lane L1 (that is, the distance from the vehicle M1 to the vehicle M4) is reduced. It is not desirable that the length of the rear space RS becomes extremely short. The reason for this is that the occurrence of an influence on the traffic stream of the first lane L1, such as forcing the vehicle M4 to decelerate, is predicted. Therefore, in the embodiment, the decrement control may be executed only when the length of the rear space RS is sufficient. That is, when the length of the rear space RS is not sufficient, the execution of the deceleration control may be stopped.

2. Driving Support Apparatus 2-1. Configuration Example

Figure 7:
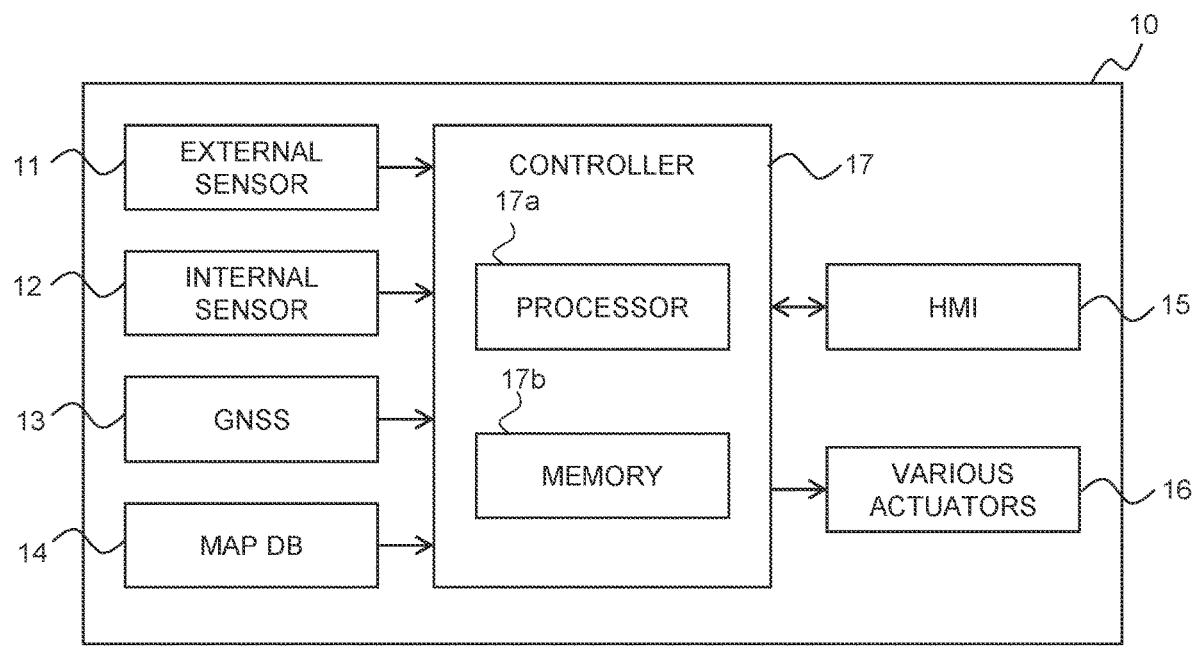
FIG. 7 is a diagram illustrating a configuration example of a driving support apparatus according to the embodiment.

FIG. 7 is a block diagram illustrating an example configuration of a driving support apparatus according to an embodiment. In the example shown in FIG. 7, the driving support apparatus 10 includes an external sensor 11, an internal sensor 12, a global navigation satellite system (GNSS) receiver 13, and a map database 14. The driving support apparatus 10 also includes a human machine interface (HMI) unit 15, various actuators 16, and a controller 17.

The external sensor 11 is a device that detects surrounding circumstances of the vehicle M1. Examples of the external sensor 11 include a radar sensor and a camera. The radar sensor detects objects around the vehicle M1 using radio waves (for example, millimeter waves) or light. The object includes a static object and a moving body. Examples of the static object include a guard rail and a building. Moving bodies include walkers, bicycles, motorcycles and vehicles other than the vehicle M1. The camera images a situation outside the vehicle M1. The camera images at least a front side of the vehicle M1. The camera may include a camera for imaging the rear and side of the vehicle M1.

The internal sensor 12 is a device that detects a driving state of the vehicle M1. Examples of the internal sensor 12 include a vehicle speed sensor, an acceleration sensor, and a yaw rate sensor. The vehicle speed sensor detects the speed of the vehicle M1 (i.e., the speed $V_{M1}$). The acceleration sensor detects acceleration (or deceleration) of the vehicle M1. The yaw rate sensor detects a yaw rate around a vertical axis of the center of gravity of the vehicle M1.

The GNSS receiver 13 is a device that receives signals from three or more artificial satellites. The GNSS receiver 13 is also a device that acquires information on the position of the vehicle M1. The GNSS receiver 13 calculates the position and attitude (direction) of the vehicle M1 based on the received signal.

The map database 14 is a database that stores map information. Examples of the map information include positional information on roads, information on road shapes (for example, types of curves and straight lines), and positional information on intersections and construction. The map information includes information on traffic regulation such as a legal speed. The map database 14 is formed in an in-vehicle memory device (for example, a hard disk or a flash memory). The map database 14 may be formed in a computer of an external device (for example, an external server) capable of communicating with the vehicle M1.

The information on the surrounding circumstances of the vehicle M1 acquired by the external sensor 11, the information on the driving state acquired by the internal sensor 12, the information on the position and posture acquired by the GNSS receiver 13, and the map information are included in the "information on a driving environment" of the vehicle M1. As the information on the driving environment particularly related to the embodiment, the information on the surrounding circumstances of the vehicle M1 includes information on a space SP in the second lane L2, information on the speed of traffic stream (i.e., the speed $V_{L2}$) in the second lane L2, information on the speed of traffic stream (i.e., the speed $V_{L1}$) in the first lane L1, and information on the distance (a front inter-vehicular distance) $D_{12}$ from the vehicle M1 to the vehicle M2 in the first lane.

The HMI unit 15 is a user interface for providing information to the driver of the vehicle M1 and receiving information from the driver. The HMI unit 15 includes, for example, an input device, a display device, a speaker, and a microphone. Examples of the input device include a touch panel, a keyboard, a switch, and a button. The information provided to the driver includes information on the driving environment of the vehicle M1 and information on driving support control that is being executed. Information is provided to the driver using a display device and a speaker. Information is received from the driver by using an input device and a microphone.

The various actuators 16 are actuators included in driving devices (drive, brake and steering devices) of the vehicle M1. Examples of the various actuators 16 include a drive actuator, a braking actuator, and a steering actuator. The drive actuator drives the vehicle M1. The braking actuator applies a braking force to the vehicle M1. The steering actuator steers tires of the vehicle M1.

The controller 17 includes a microcomputer having at least one processor 17a and at least one memory 17b. At least one program is stored in the memory 17b. The at least one program includes a driving support program according to an embodiment. Various information including the information on the driving environment of the vehicle M1 is also stored in the memory 17b. When the program stored in the memory 17b is read and executed by the processor 17a, various functions of the controller 17 are realized. The various functions include a function of performing driving support control of the vehicle M1 using the various actuators 16.

2-2. Processing Example

Figure 8:
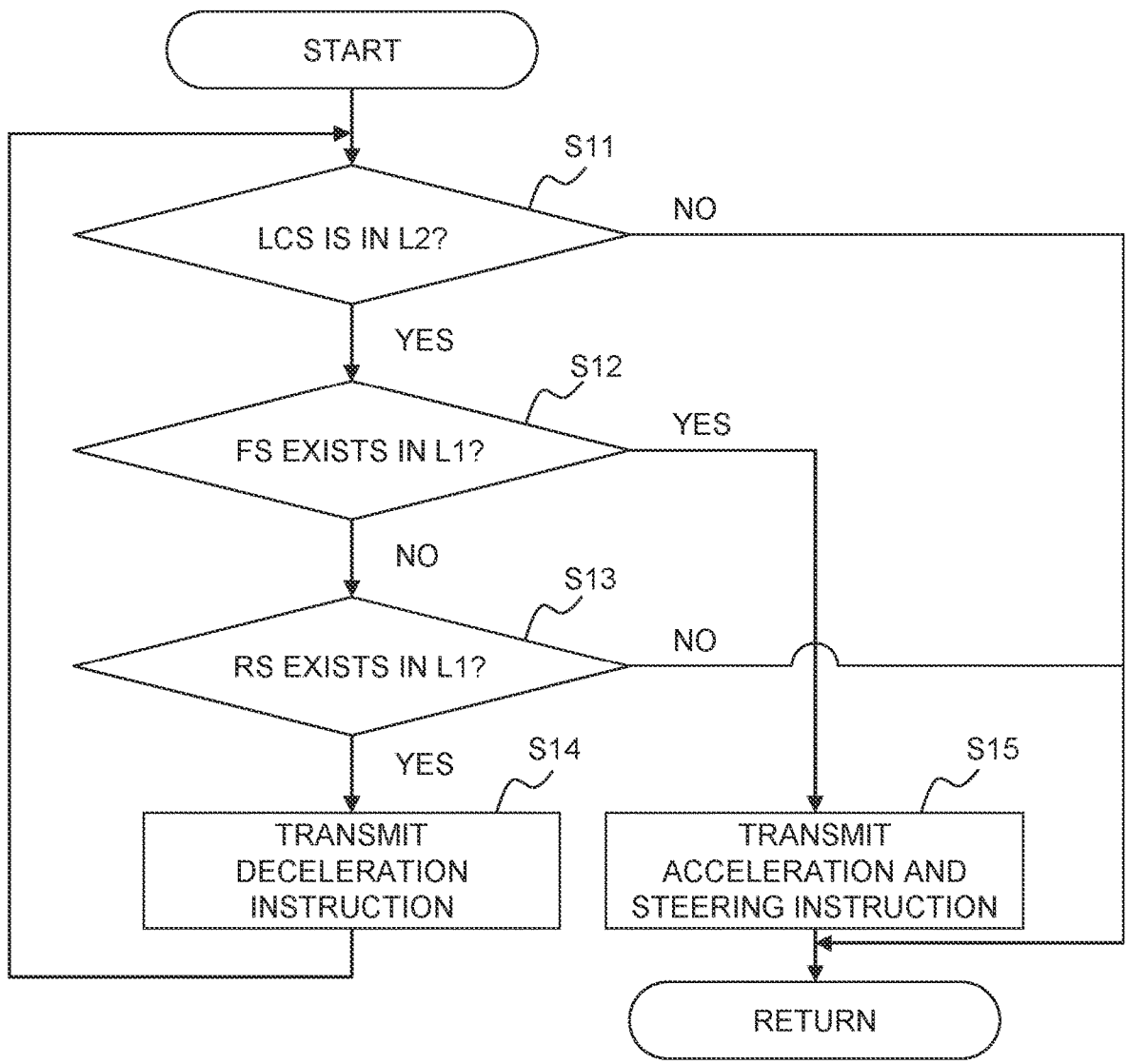
FIG. 8 is a flowchart illustrating processing flow particularly relevant to the embodiment.

FIG. 8 is a flowchart showing a flow of processing (the vehicle control processing for the lane change) particularly related to the embodiment, which is performed by the controller 17 (the processor 17a). The processing routine shown in FIG. 8 is repeatedly executed at a predetermined control cycle when the driving support program for the lane change is activated in the case where the speed $V_{L2}$ is higher than the speed $V_{L1}$, for example.

Figure 9:
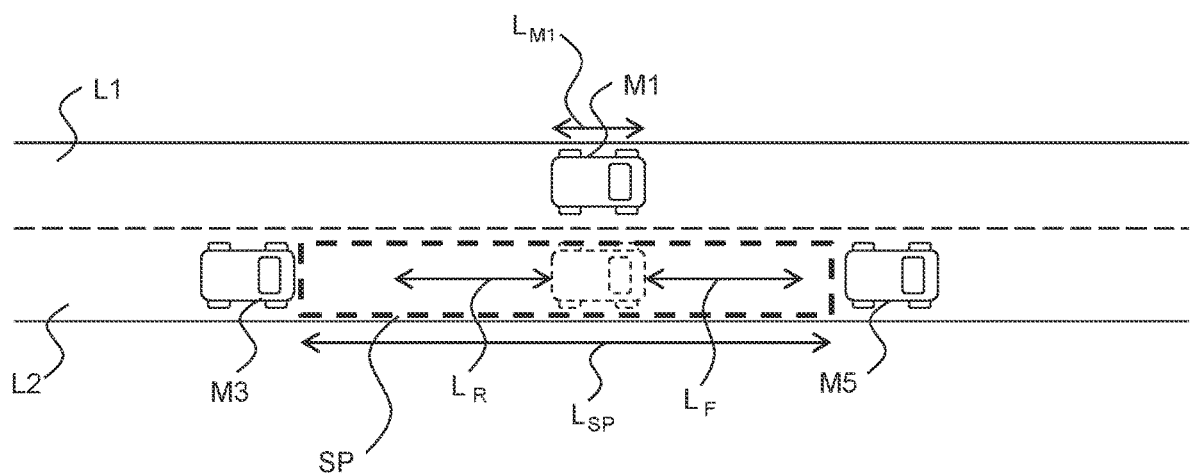
FIG. 9 is a diagram for explaining processing of step S11 shown in FIG. 8.

In the routine shown in FIG. 8, it is first determined whether or not there is a space LCS in which a lane change is possible in the second lane L2 (step S11). FIG. 9 is a diagram for explaining the processing in step S11. In FIG. 9, the space SP in the second lane L2 is drawn. The space SP is, for example, a space between the vehicle M3 and a vehicle M5 in the second lane L2. The space SP is also a space existing on the side of the vehicle M1. Note that the vehicle M5 may not exist on the second lane L2. When the vehicle M5 does not exist, the front space of the vehicle M3 in the second lane L2 corresponds to the space SP.

For example, when the space SP satisfies the condition of following formula (1), it is determined that the space SP is a space LCS in which a lane change is possible.

$$L_{SP} > L_{M1} + L_F + L_R \quad (1)$$

In the formula (1), $L_{SP}$ is a length of the space SP, $L_{M1}$ is a vehicle length of the vehicle M1, $L_F$ is the length of a front space required for lane change, and $L_R$ is the length of a rear space required for lane change. The lengths $L_F$ and $L_R$ are variables that depend on the speed $V_{M1}$.

Figure 10:
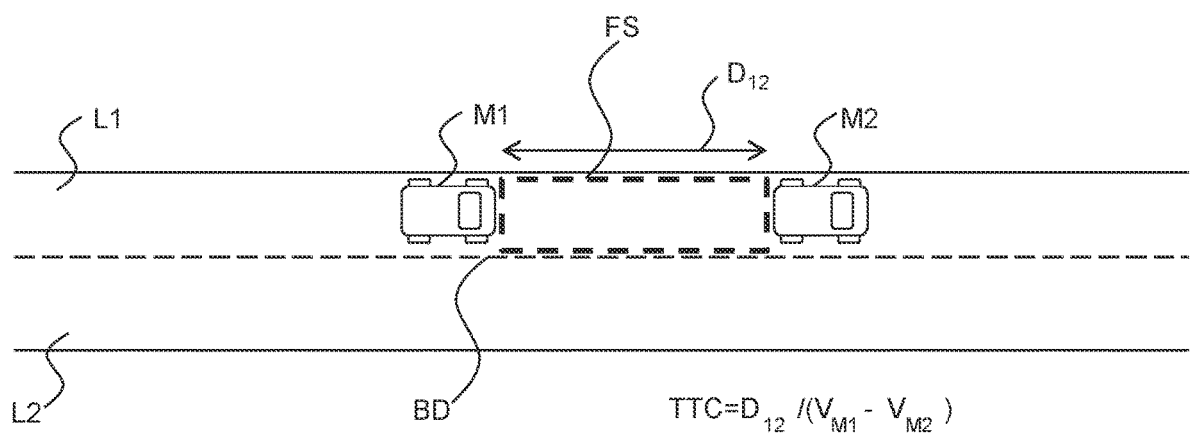
FIG. 10 is a diagram for explaining processing of step S12 shown in FIG. 8.

When the determination result of the step S11 is positive, it is determined whether or not the front space FS capable of accelerating the vehicle M1 exists on the first lane L1 (step S12). FIG. 10 is a diagram for explaining the processing in step S12. In FIG. 10, the front space FS is depicted. The length of the front space FS is substantially equal to the distance $D_{12}$ from the vehicle M1 to the vehicle M2. When the vehicle M1 moves to the second lane L2 while accelerating from the first lane L1, the distance $D_{12}$ needs to be a distance at which the vehicle M1 does not come into contact with the vehicle M2 and the driver of the vehicle M1 does not feel fear or pressure caused by the acceleration of the vehicle M1.

The distance at which the vehicle M1 does not contact the vehicle M2 can be represented by a value TTC ($D_{12}/V_{M1} - V_{M2}$) obtained by dividing the distance $D_{12}$ by the relative speed. In the lane change accompanied by acceleration, the vehicle M1 and the vehicle M2 come closest to each other at the moment when the overlap ratio in the lateral position direction of both becomes 0. This moment is referred to as minimum TTC. In the embodiment, the minimum TTC at which the driver of the vehicle M1 can safely change lanes is set as the front safe time $TTC_{OPT\_F}$.

Here, the time TLC required for the lane change is considered. Then, the time required for the vehicle M2 to reach the boundary BD between the first lane L1 and the second lane L1 after the steering of the vehicle M2 toward the second lane L1 is considered to be half of the time TLC (i.e., TLC/2). In the embodiment, it is assumed that the vehicle M1 accelerates at a maximum acceleration rate $a_{max}$. Then, the vehicle M1 approaches the vehicle M1 during a period from the start of steering of the vehicle M1 until the vehicle M2 reaches the boundary BD. The shortened inter-vehicular distance $D_{ACC}$ is expressed by the following formula (2).

$$D_{ACC} = \{V_{M1}*(TLC/2) + a_{max}*(1/2)*(TLC/2)^2\} \quad (2)$$

In addition, when the vehicle M1 accelerates at the maximum acceleration rate $a_{max}$, the front safe time $TTC_{OPT\_F}$ also fluctuates during a period from when the steering of the vehicle M1 is started to when the vehicle M1 reaches the boundary BD. Considering the variation of the front safe time $TTC_{OPT\_F}$, it is understood that the vehicle M1 does not come into contact with the vehicle M2 and the driver of the vehicle M2 does not feel fear or pressure caused by acceleration of the vehicle M1 if the distance $D_{12}$ satisfies the condition of the following formula (3).

$$D_{12} = D_{ACC} + TTC_{OPT\_F}*a_{max}*(TLC/2) \quad (3)$$

In the processing of Step S12, when the distance $D_{12}$ satisfies the condition of the following formula (4), it is determined that the front space FS capable of accelerating the vehicle M1 exists on the first lane L1.

$$D_{12} \geq D_{ACC} + TTC_{OPT\_F}*a_{max}*(TLC/2) \quad (4)$$

Figure 11:
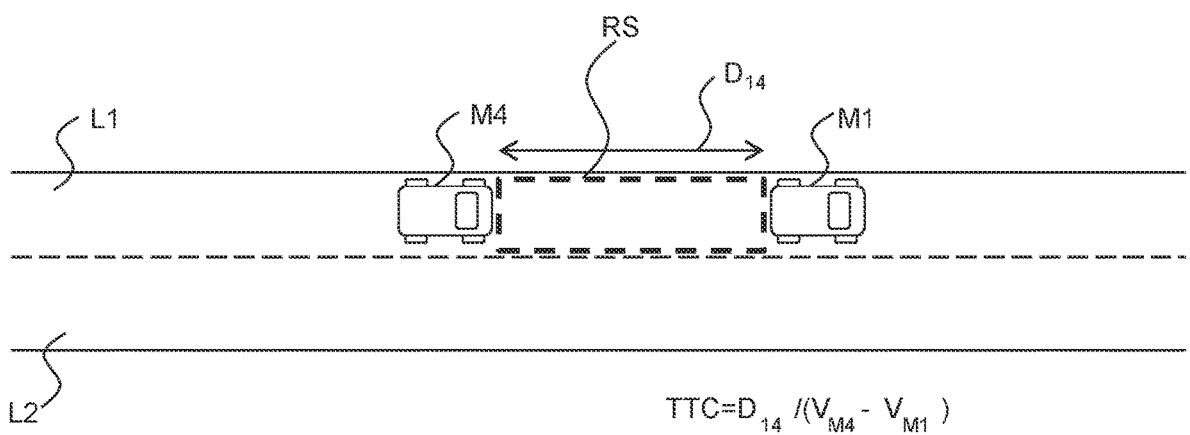
FIG. 11 is a diagram for explaining processing of step S13 shown in FIG. 8.

The processing executed when the determination result in step S12 is positive will be described later. When the determination result of step S12 is negative, it is determined whether or not a rear space RS capable of decelerating the vehicle M1 is present on the first lane L1 (step S13). FIG. 11 is a diagram for explaining the processing in step S13. In FIG. 11, a rear space RS is depicted. The length of the rear space RS is substantially equal to a distance $D_{14}$ from the vehicle M1 to the vehicle M4. When the vehicle M1 decelerates at the first lane L1, the distance $D_{14}$ needs to be a distance at which the vehicle M1 does not come into contact with the vehicle M4 and does not give the driver of the vehicle M4 a feeling of approach due to the deceleration of the vehicle M1.

In the embodiment, the TTC that does not give a sense of approach to the driver of the vehicle M4 is set as the rear safety time $TTC_{OPT\_R}$. On the other hand, the distance at which the vehicle M1 does not contact the vehicle M4 can be represented by a value TTC ($D_{14}/V_{M4} - V_{M1}$) obtained by dividing the distance $D_{14}$ by the relative speed. In the processing of step S13, when the condition of following formula (5) is satisfied, it is determined that the rear space RS capable of decelerating the vehicle M1 is present on the first lane L1.

$$TTC(D_{14}/V_{M4} - V_{M1}) \geq TTC_{OPT\_R} \quad (5)$$

If the determination result of step S13 is positive, a determination instruction is transmitted (step S14). The deceleration instruction is an instruction for temporarily decelerating the vehicle M1, and is transmitted to the braking device of the vehicle M1. Note that the declaration is optional. When the processing of step S14 is executed, the processing of step S11 and subsequent processing are executed. That is, when the determination result of the step S13 is positive, the vehicle M1 is temporarily decelerated and the space LCS is searched.

If the determination result in step S12 is positive, an acceleration and steering instruction is transmitted (step S15). The acceleration and steering instruction is an instruction for moving from the first lane L1 to the target space TS (i.e., lane change). The acceleration instruction is transmitted to the driving device of the vehicle M1, and the steering instruction is transmitted to the steering device of the vehicle M1.

3. Assessment Result by Numerical Analysis

Figure 12:
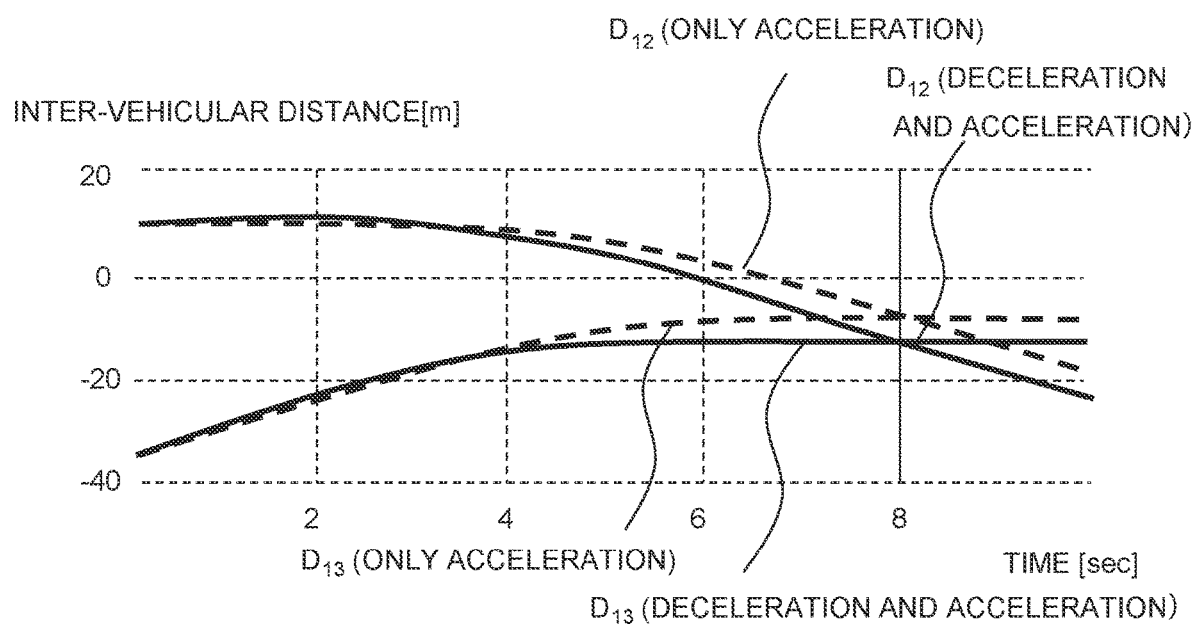
FIG. 12 is a diagram for explaining a numerical analysis performed by an inventor of the present disclosure.

FIG. 12 is a diagram for explaining a numerical analysis performed by an inventor of the present disclosure. This numerical analysis was performed by setting the parameter conditions shown in the following Table 1 with the scene described in FIG. 5 as a premise scene.

TABLE 1

| Parameter | Value | Unit |
|---|---|---|
| VL1 | 80 | km/h |
| VL2 | 100 | km/h |
| D12(distance from M1 to M2) | 10 | m |
| D14(distance from M1 to M4) | 10 | m |
| D13(distance from M1 to M3) | 37 | m |
| Maximum deceleration | 0.7 | m/s^2 |
| Maximum acceleration | 1.4 | m/s^2 |
| Allowable mimimum TTC | 6 | sec |
| LSP | 25 | m |
| TLC | 6 | sec |

"Deceleration and acceleration" shown in FIG. 12 corresponds to the temporal change of the inter-vehicular distance according to the method of the embodiment, and "only acceleration" corresponds to that according to the comparative example. Further, the distance $D_{12}$ shown in FIG. 12 and Table 1 is based on the direction in which the first lane L1 extends, and the distance $D_{13}$ is based on the direction in which the second lane L2 extends. Note that the distance $D_{14}$ is omitted in FIG. 12.

When the minimum inter-vehicular distance and the minimum TTC during the lane change were calculated from the time change in FIG. 12, the assessment results shown in the following Table 2 were obtained.

TABLE 2

| Evaluation result | Deceleration & Acceleration | Only Acceleration | Unit |
|---|---|---|---|
| D14_MIN(minimum inter-vehicular distance from M1 to M4) | 9.12 | 10 | m |
| Minimum $TTC_{14}$ | 10.3 | — | sec |
| D12_MIN(minimum inter-vehicular distance from M1 to M2) | 10.03 | 10 | m |
| Minimum $TTC_{12}$ | 6.8 | — | sec |
| D13_MIN(minimum inter-vehicular distance from M1 to M3) | 54.54 | 20.14 | m |
| Minimum $TTC_{13}$ | 6.06 | 5.56 | sec |

From the results of Table 2, it was found that in both cases of "only acceleration" and "deceleration and acceleration", the minimum TTC (the minimum $TTC_{12}$ and the minimum $TTC_{14}$) exceeds the allowable minimum TTC (6.0 seconds) for the vehicles M2 and M4 on the first lane L1. On the other hand, it was found that in the case of "deceleration and acceleration", the minimum $TTC_{13}$ exceeds the allowable minimum TTC (6.0 seconds) for the vehicle M2 in the second lane L3, whereas in the case of "only acceleration", the minimum $TTC_{13}$ falls below the allowable minimum TTC. Therefore, in the case of the scene described in FIG. 5 and the parameter conditions shown in Table 1, it was shown that the method of the embodiment is particularly effective.

What is claimed is:

1. A method for supporting driving of a vehicle including a lane change from a first lane to a second lane, the method comprising the step of:
 executing vehicle control for the lane change based on information on a driving environment of the vehicle,
 wherein the information on the driving environment includes information on a space in the second lane, information on a speed of a traffic stream of the second lane, information on the speed of the traffic stream of the first lane, and information on a front inter-vehicular distance indicating a distance between the vehicle and a preceding vehicle of the vehicle in the first lane,
 wherein the step of executing the vehicle control comprises the steps of:
  setting a target space in the second lane based on the information on the space in the second lane;
  when the speed of the traffic stream of the second lane is higher than that in the first lane, determining whether acceleration of the vehicle is able to perform in a front space of the vehicle in the first lane based on the front inter-vehicular distance, a shortened inter-vehicular distance indicating a distance between the vehicle and the preceding vehicle that is shortened when the vehicle runs on the first lane at a preset acceleration rate, and a front safe distance from the vehicle to the preceding vehicle;
  executing acceleration and steering control of the vehicle to move from the first lane to the target space when it is determined that the acceleration of the vehicle is able to perform; and
  executing temporal deceleration control of the vehicle on the first lane when it is determined that the acceleration of the vehicle is unable to perform,
 wherein the information on the driving environment further includes a rear inter-vehicular distance information indicating a distance between the vehicle and a following vehicle of the vehicle in the first lane,
 wherein the step of executing the vehicle control further comprising the step of determining whether deceleration of the vehicle is able to perform in a rear space of the vehicle in the first lane based on the rear inter-vehicular distance and a rear safety distance from the vehicle to the following vehicle, and
 wherein the temporal deceleration control of the vehicle on the first lane is executed when it is determined that the acceleration of the vehicle is unable to perform and it is determined that the deceleration of the vehicle is able to perform.

2. The method according to claim 1, wherein:
 the information on the driving environment further comprises information on a speed of the vehicle, information on a speed of the preceding vehicle, and information on a speed of the following vehicle; and
 the speed of the traffic stream of the first lane is calculated based on at least one of the speed of the vehicle, the speed of the preceding vehicle, and the speed of the following vehicle.

3. The method according to claim 1, wherein:
 the information on the driving environment further comprises information on a speed of a following vehicle of the vehicle on the second lane; and
 the speed of the traffic stream of the second lane is calculated based on at least the speed of the following vehicle on the second lane.

4. An apparatus for supporting traveling of a vehicle including a lane change from a first lane to a second lane, comprising:
 a processor configured to execute vehicle control processing for the lane change based on information on a driving environment of the vehicle,
 wherein the information on the driving environment includes information on a space in the second lane, information on a speed of a traffic stream of the second lane, information on the speed of the traffic stream of the first lane, and information on a front inter-vehicular distance indicating a distance between the vehicle and a preceding vehicle of the vehicle in the first lane, wherein, in the vehicle control processing, the processor is configured to:
- execute processing to set a target space in the second lane based on the information on the space in the second lane;
- when the speed of the traffic stream of the second lane is higher than that in the first lane, execute processing to determine whether acceleration of the vehicle is able to perform in a front space of the vehicle in the first lane based on the front inter-vehicular distance, a shortened inter-vehicular distance indicating a distance between the vehicle and the preceding vehicle that is shortened when the vehicle runs on the first lane at a preset acceleration rate, and a front safe distance from the vehicle to the preceding vehicle;
- execute processing to perform acceleration and steering control of the vehicle to move from the first lane to the target space when it is determined that the acceleration of the vehicle is able to perform; and
- execute processing to perform temporal deceleration control of the vehicle on the first lane when it is determined that the acceleration of the vehicle is unable to perform, wherein the information on the driving environment further includes a rear inter-vehicular distance information indicating a distance between the vehicle and a following vehicle of the vehicle in the first lane, wherein in the vehicle control processing, the processor is further configured to determine whether deceleration of the vehicle is able to perform in a rear space of the vehicle in the first lane based on the rear inter-vehicular distance and a rear safety distance from the vehicle to the following vehicle, and wherein the temporal deceleration control of the vehicle on the first lane is executed when it is determined that the acceleration of the vehicle is unable to perform and it is determined that the deceleration of the vehicle is able to perform.

* * * * *